(12) United States Patent
Han et al.

(10) Patent No.: US 12,361,587 B2
(45) Date of Patent: Jul. 15, 2025

(54) VEHICLE AND VEHICLE POSITION CALCULATION METHOD

(71) Applicants: Hyundai Motor Company, Seoul (KR); KIA CORPORATION, Seoul (KR)

(72) Inventors: Jihee Han, Seoul (KR); Junsik An, Seoul (KR); Jungphil Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 218 days.

(21) Appl. No.: 18/214,764

(22) Filed: Jun. 27, 2023

(65) Prior Publication Data

US 2024/0153129 A1 May 9, 2024

(30) Foreign Application Priority Data

Nov. 8, 2022 (KR) .................. 10-2022-0147932

(51) Int. Cl.
*G06T 7/73* (2017.01)
*B60W 30/09* (2012.01)
(Continued)

(52) U.S. Cl.
CPC .............. *G06T 7/73* (2017.01); *B60W 30/09* (2013.01); *B60W 40/10* (2013.01); *G06T 7/246* (2017.01);
(Continued)

(58) Field of Classification Search
CPC . G06T 7/73; G06T 7/246; G06T 2207/10016; G06T 2207/30252;
(Continued)

(56) References Cited

U.S. PATENT DOCUMENTS 7,058,207 B2   6/2006  Iida et al.
9,862,318 B2 *  1/2018  Lessmann ............ G06V 10/764
(Continued)

FOREIGN PATENT DOCUMENTS

JP     2002-314991 A   10/2002
KR       101693820 B1    1/2017
(Continued)

*Primary Examiner* — Andrew Joseph Rudy
(74) *Attorney, Agent, or Firm* — Banner & Witcoff, Ltd.

(57) ABSTRACT

Disclosed are a vehicle and a vehicle position calculation method. The vehicle includes an image sensor. The image may acquire, using the image sensor, a video image of a target vehicle, determine, based on the video image, a set of location points of the target vehicle, project, based on the determined set of location points, first three-dimensional coordinate values of location points corresponding to front and rear wheels of the target vehicle onto a two-dimensional plane by converting the first three-dimensional coordinate values into first two-dimensional coordinate values in the video image, project, based on the determined set of location key points, second three-dimensional coordinate values of location points corresponding to bumpers of the target vehicle onto the two-dimensional plane by converting the second three-dimensional coordinate values into second two-dimensional coordinate values in the video image, and control, based on the three-dimensional coordinate values and the second three-dimensional coordinate values, the host vehicle.

15 Claims, 8 Drawing Sheets

(51) Int. Cl.
*B60W 40/10* (2012.01)
*G06T 7/246* (2017.01)

(52) U.S. Cl.
CPC ... *B60W 2420/403* (2013.01); *B60W 2554/80* (2020.02); *G06T 2207/10016* (2013.01); *G06T 2207/30252* (2013.01)

(58) Field of Classification Search
CPC .. B60W 30/09; B60W 40/10; B60W 2420/42; B60W 2554/80
USPC ......................................................... 701/301
See application file for complete search history.

(56) References Cited

U.S. PATENT DOCUMENTS

| | | | |
|---|---|---|---|
| 10,983,215 B2 * | 4/2021 | Li | G01S 17/89 |
| 11,292,462 B1 * | 4/2022 | Karasev | G05D 1/0221 |
| 11,314,972 B2 | 4/2022 | Cho | |
| 12,223,740 B2 * | 2/2025 | Zhao | G06V 20/64 |
| 2017/0287168 A1 | 10/2017 | Jeong et al. | |
| 2024/0029451 A1 * | 1/2024 | Li | G06V 20/56 |
| 2024/0096111 A1 * | 3/2024 | Agarwal | G06T 7/73 |

FOREIGN PATENT DOCUMENTS

| | | |
|---|---|---|
| KR | 10-2017-0128727 A | 11/2017 |
| KR | 10-2020-0000953 A | 1/2020 |
| KR | 10-2020-0103984 A | 9/2020 |

\* cited by examiner

VEHICLE AND VEHICLE POSITION CALCULATION METHOD

CROSS-REFERENCE TO RELATED APPLICATION(S)

This application is based on and claims priority to Korean Patent Application No. 10-2022-0147932, filed Nov. 8, 2022, in the Korean Intellectual Property Office, the disclosure of which is incorporated by reference herein in its entirety.

BACKGROUND

1. Field

The disclosure relates to a vehicle and a vehicle position calculation method.

2. Description of the Related Art

A surround view monitor (SVM) is a device capable of seeing front, rear, left and right sides through a camera mounted on a vehicle. A deep Learning-based image recognition device may recognize key points (feature points) of a target vehicle (object) in a video image captured by the SVM camera.

The recognized key point information may include key point positions in the video image, information on a part of an object indicated by each key point, and image pixel values.

However, in a process of calculating an actual position of a three-dimensional world coordinate system of each pixel of the image through camera parameters, calculations may be performed under the assumption that the position is the ground (z=0; height is 0), but because a bumper part of a vehicle is displaced from the position of the ground (z>0), it may be difficult to obtain the correct position in the three-dimensional world coordinate system (x (longitudinal distance), y (lateral distance)).

That is, because it may be difficult or impossible to obtain a three-dimensional world coordinate value of a key point using only two-dimensional image pixel values. In particular, because a bumper of a target vehicle may be installed at a certain distance from the ground, it may be difficult to calculate a distance between a host vehicle and the target vehicle through a video image recognition result.

SUMMARY

It is an aspect of the disclosure to provide a vehicle and vehicle position calculation method capable of calculating a distance and heading angle between a host vehicle and a target vehicle through video image recognition results obtained by converting key points of front and rear wheels and bumpers of a target vehicle into two-dimensional coordinate values.

Additional aspects of the disclosure will be set forth in part in the description which follows and, in part, will be obvious from the description, or may be learned by practice of the disclosure.

According to one or more example embodiments of the present disclosure, a host vehicle may include: an image sensor; one or more processors; and memory. The memory may store instructions that, when executed by the one or more processors, cause the host vehicle to: acquire, using the image sensor, a video image of a target vehicle; determine, based on the video image, a set of location points of the target vehicle; project, based on the determined set of location points, first three-dimensional coordinate values of location points corresponding to front and rear wheels of the target vehicle onto a two-dimensional plane by converting the first three-dimensional coordinate values into first two-dimensional coordinate values in the video image; project, based on the determined set of location key points, second three-dimensional coordinate values of location points corresponding to bumpers of the target vehicle onto the two-dimensional plane by converting the second three-dimensional coordinate values into second two-dimensional coordinate values in the video image; and control, based on the first three-dimensional coordinate values and the second three-dimensional coordinate values, the host vehicle.

The instructions, when executed by the one or more processors, may further cause the host vehicle to project the second three-dimensional coordinate values onto the two-dimensional plane by: calculating the second three-dimensional coordinate values based on a first condition in which the location points corresponding to the bumpers have a common Z value in a three-dimensional coordinate system and based on a second condition in which a line, projected onto the two-dimensional plane, that connects the location points corresponding to the bumpers is perpendicular to a line, projected onto the two-dimensional plane, that connects the front and rear wheels.

The instructions, when executed by the one or more processors, may cause the host vehicle to calculate the second three-dimensional coordinate values of the location points corresponding to the bumpers projected onto the two-dimensional plane by: representing, in the three-dimensional coordinate system, X and Y coordinate values, of the location points corresponding to the bumpers determined in the video image, as a functional relationship with respect to Z coordinate values; representing the second three-dimensional coordinate values of the location points corresponding to the bumpers as a functional relationship with respect to height values by applying the first condition to a functional relationship with respect to the Z coordinate values; and applying the second condition to the functional relationship with respect to the height values.

The instructions, when executed by the one or more processors, may further cause the host vehicle to: correct positions, in a two-dimensional coordinate system, of the location points corresponding to the bumpers based on a movement amount, in a plurality of consecutive video images, of the set of location points of the target vehicle between a first position of the target vehicle and a second position of the target vehicle.

The instructions, when executed by the one or more processors, may further cause the host vehicle to: represent a movement amount, in a plurality of consecutive video images, of two-dimensional coordinate values of the set of location points of the target vehicle, between a first position of the target vehicle and a second position of the target vehicle, as a movement amount vector; and calculate, based on the movement amount vector and a traveling direction vector of the host vehicle, a heading angle of the target vehicle.

The instructions, when executed by the one or more processors, may further cause the host vehicle to: determine whether the target vehicle is common across a plurality of consecutive video images, based on a movement amount of the location points corresponding to the front and rear wheels of the target vehicle determined in the plurality of consecutive video images.

According to one or more example embodiments of the present disclosure, a method may include: acquiring, via an image sensor of a host vehicle, a video image of a target vehicle; determining, based on the video image, a set of location points of the target vehicle; projecting, based on the determined set of location points, first three-dimensional coordinate values of location points corresponding to front and rear wheels of the target vehicle onto a two-dimensional plane by converting the first three-dimensional coordinate values into first two-dimensional coordinate values in the video image; projecting, based on the determined set of location points, second three-dimensional coordinate values of location points corresponding to bumpers of the target vehicle onto the two-dimensional plane by converting the second three-dimensional coordinate values into second two-dimensional coordinate values in the video image; and control, based on the first three-dimensional coordinate values and the second three-dimensional coordinate values, the host vehicle.

Projecting of the second three-dimensional coordinate values onto the two-dimensional plane may include: calculating the second three-dimensional coordinate values based on a first condition in which the location points corresponding to the bumpers have a common Z value in a three-dimensional coordinate system and based on a second condition in which a line, projected onto the two-dimensional plane, that connects the location points corresponding to the bumpers is perpendicular to a line, projected onto the two-dimensional plane, that connects the front and rear wheels.

Calculating of the second three-dimensional coordinate values may include: representing, in the three-dimensional coordinate system, X and Y coordinate values, of the location points corresponding to the bumpers determined in the video image, as a functional relationship with respect to Z coordinate values; representing the second three-dimensional coordinate values of the location points corresponding to the bumpers as a functional relationship with respect to height values by applying the first condition to the functional relationship with respect to the Z coordinate values; and applying the second condition to the functional relationship with respect to the height values.

The method may further include: correcting positions, in a two-dimensional coordinate system, of the location points corresponding to the bumpers based on a movement amount, in a plurality of consecutive video images, of the set of location points of the target vehicle between a first position of the target vehicle and a second position of the target vehicle.

The method may further include: representing a movement amount, in a plurality of consecutive video images, of two-dimensional coordinate values of the set of location points of the target vehicle, between a first position of the target vehicle and a second position of the target vehicle, as a movement amount vector; and calculating, based on the movement amount vector and a traveling direction vector of the host vehicle, a heading angle of the target vehicle.

The method may further include: determining whether the target vehicle is common across a plurality of consecutive video images, based on a movement amount of the location points corresponding to the front and rear wheels of the target vehicle determined in the plurality of consecutive video images.

Determining whether the target vehicle is common across the plurality of consecutive video images may include: determining that the target vehicle is common across the plurality of consecutive video images based on the movement amount of the location points corresponding to the front and rear wheels of the target vehicle being at a minimum among distances among the set of location points.

Determining whether the target vehicle is common across the plurality of consecutive video images may include: determining that the target vehicle is common across the plurality of consecutive video images based on an overlapping area between a first quadrilateral, formed by the location points corresponding to the front and rear wheels at a first time, and a second quadrilateral, formed by the location points corresponding to the front and rear wheels at a second time, being greater than a threshold value.

The method may further include: determining that the target vehicle is a closest vehicle to the host vehicle.

BRIEF DESCRIPTION OF THE DRAWINGS

These and/or other aspects of the disclosure will become apparent and more readily appreciated from the following description of one or more example embodiments, taken in conjunction with the accompanying drawings of which.

DETAILED DESCRIPTION

Figure 1:
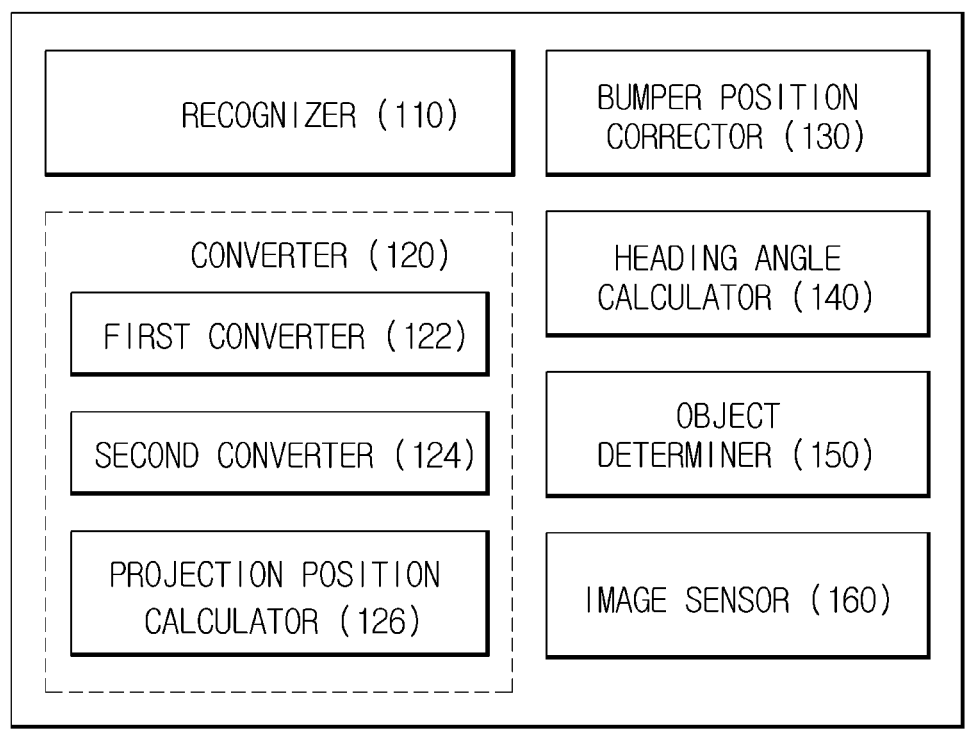
FIG. 1 is a block diagram illustrating components of a vehicle.

Throughout the specification, like reference numerals refer to like components. This specification does not describe all factors of example embodiments, and duplicative contents between general contents or example embodiments in the technical field of the disclosure will be omitted.

Throughout the specification, when a part is referred to as being "connected" to another part, it includes not only a direct connection but also an indirect connection, and the indirect connection includes connecting through a wireless network.

When it is described that a part "includes" a component, it means that the may further include other components, not excluding the other components unless specifically stated otherwise.

The singular forms "a," "an," and "the" include plural referents unless the context clearly dictates otherwise.

In addition, terms such as "~unit", "~part," "~block," "~member," "~module," and the like may denote a unit for processing at least one function or operation. For example, the terms may refer to at least one hardware such as a field-programmable gate array (FPGA)/an application specific integrated circuit (ASIC), at least one software stored in a memory, or at least one process processed by a processor.

In each step, an identification numeral is used for convenience of explanation, the identification numeral does not describe the order of the steps, and each step may be performed differently from the order specified unless the context clearly states a particular order.

Hereinafter, one or more example embodiments of the disclosure will be described in detail with reference to the accompanying drawings.

Referring to FIG. 1, a vehicle 100 includes a recognizer 110 provided to recognize key points (e.g., a set of location points) in a video image of a target vehicle, and a converter 120 provided to project the key points recognized by the recognizer 110 onto a plane to convert the projected key points into two-dimensional coordinate values in the video image. The video image of the target vehicle may be acquired via an image sensor 160. The image sensor may be, for example, a camera.

The converter 120 may include a first converter 122 provided to project three-dimensional world coordinate values (also referred to as three-dimensional coordinate values) of key points of front and rear wheels in contact with the ground among the key points recognized by the recognizer 110 onto the plane to convert the projected three-dimensional world coordinate values into two-dimensional coordinate values in the video image, and a second converter 124 provided to project three-dimensional world coordinate values of key points of bumpers among the key points recognized by the recognizer 110 onto the plane to convert the projected three-dimensional world coordinate values into two-dimensional coordinate values in the video image.

The converter 120 may also include a projection position calculator 126 provided to calculate positions of the three-dimensional world coordinate values of the key points of the bumpers projected onto the plane, based on a first condition in which the key points of the bumpers have the same Z value in the world coordinate system and a second condition in which a line connecting the key points of the bumpers and a line connecting the front and rear wheels, which are projected onto the plane, form a perpendicular.

The projection position calculator 126 may calculate positions of the bumper key points projected on the plane by representing X and Y coordinate values of the key points recognized in the video image in the three-dimensional world coordinate system as a functional relationship with respect to Z coordinate values, representing the three-dimensional world coordinate system of the bumper key points as a functional relationship with respect to height values by applying the first condition to the functional relationship with respect to the Z coordinate values, and applying the second condition to the functional relationship with respect to the height values.

The vehicle 100 may further include a bumper position corrector 130 provided to correct positions of the bumper key points on a two-dimensional coordinate system based on a movement amount of key points of the target vehicle recognized at a first position and a second position in a plurality of consecutive video images.

The vehicle 100 may further include a heading angle calculator 140 provided to represent the movement amount of two-dimensional coordinate values of the target vehicle key points recognized at the first and second positions in the plurality of consecutive video images as a vector and to calculate a heading angle of the target vehicle based on the corresponding movement amount vector and a traveling direction vector of the host vehicle.

The vehicle 100 may further include an object determiner 150 provided to determine whether the target vehicle is the same object in a plurality of consecutive video images, based on a movement amount of the key points of the front and rear wheels of the target vehicle recognized.

The vehicle 100 may include one or more controllers (not shown) to control each component of the vehicle 100 and means related thereto. The controller(s) may include various processors and a memory. The memory may store programs, instructions, applications, and the like for performing control. Each of the processors may execute the programs, instructions, applications, and the like stored in memory. The controller may include control units such as, for example, an electronic control unit (ECU) and a micro controller unit (MCU). One or more various components disclosed herein (e.g., recognizer 110, converter 120, bumper position corrector 130, heading angle calculator 140, and/or object determiner 150) may be implemented in one or more controllers.

The memory may include a non-volatile memory device such as, for example, a cache, a read only memory (ROM), a programmable ROM (PROM), an erasable programmable ROM (EPROM), an electrically erasable programmable ROM (EEPROM), and a flash memory. Also, the memory may include a volatile memory device such as a random access memory (RAM), and may include a storage medium such as a hard disk drive (HOD) and a CD-ROM. Such the memory may store, for example, video images of the vehicle 100, algorithms, and key point information.

Hereinafter, each component of the vehicle in FIG. 1 will be described in detail.

The recognizer 110 recognizes key points of the target vehicle in a video image, and may recognize the key points using, for example, morphological features of the target vehicle. The recognizer 110 may recognize the key points of the target vehicle in the video image based on deep learning.

The key point information recognized by the recognizer 110 may include positions of key points in the video image, information on a part of an object pointed to by each key point, image pixel values, and the like.

The converter 120 projects the key points recognized by the recognizer 110 onto the plane to convert the projected key points into two-dimensional coordinate values in the video image.

Specifically, the first converter 122 projects three-dimensional world coordinate values of key points of front and rear wheels in contact with the ground among the key points recognized by the recognizer 110 onto the plane to convert the projected three-dimensional world coordinate values into two-dimensional coordinate values in the video image.

Also, the second converter 124 projects three-dimensional world coordinate values of key points of bumpers among the key points recognized by the recognizer 110 onto the plane to convert the projected three-dimensional world coordinate values into two-dimensional coordinate values in the video image.

In this case, the projection position calculator 126 may calculate positions of the three-dimensional world coordinate values of the key points of the bumpers projected onto the plane, based on the first condition in which the key points of the bumpers have the same Z value in the world coordinate system and the second condition in which the line connecting the key points of the bumpers and the line connecting the front and rear wheels, which are projected onto the plane, form a perpendicular.

$$\begin{pmatrix} u \\ v \\ 1 \end{pmatrix} = K \times [R \mid T] \times \begin{bmatrix} X \\ Y \\ Z \\ 1 \end{bmatrix} \qquad \text{[Equation 1]}$$

-continued $$= \begin{bmatrix} f_x & 0 & c_x \\ 0 & f_y & c_y \\ 0 & 0 & 1 \end{bmatrix} \times \overset{\text{Camera Calibration Parameters}}{\begin{bmatrix} R_{11} & R_{12} & R_{13} & T_1 \\ R_{21} & R_{22} & R_{23} & T_2 \\ R_{31} & R_{32} & R_{33} & T_3 \end{bmatrix}} \times \begin{bmatrix} X \\ Y \\ Z \\ 1 \end{bmatrix}$$

$$= \begin{bmatrix} aX + bY + cZ + d \\ eX + fY + gZ + h \\ 1 \end{bmatrix} \Rightarrow \begin{matrix} X = f(Z) \\ Y = g(Z) \end{matrix}$$

Referring to Equation 1 above, the projection position calculator 126 may represent the X and Y coordinate values of key points recognized in the video image in the three-dimensional world coordinate system as a functional relationship with respect to the Z coordinate values.

In Equation 1, u and v represent two-dimensional image pixel values, K represents a camera internal parameter, R|T represents a camera external parameter, and X, Y, and Z represent three-dimensional world coordinate values.

Herein, the X and Y coordinate values in the three-dimensional world coordinate system may represent as a functional relationship with respect to the Z coordinate values, such as X=f(Z) and Y=g(Z).

Figure 2:
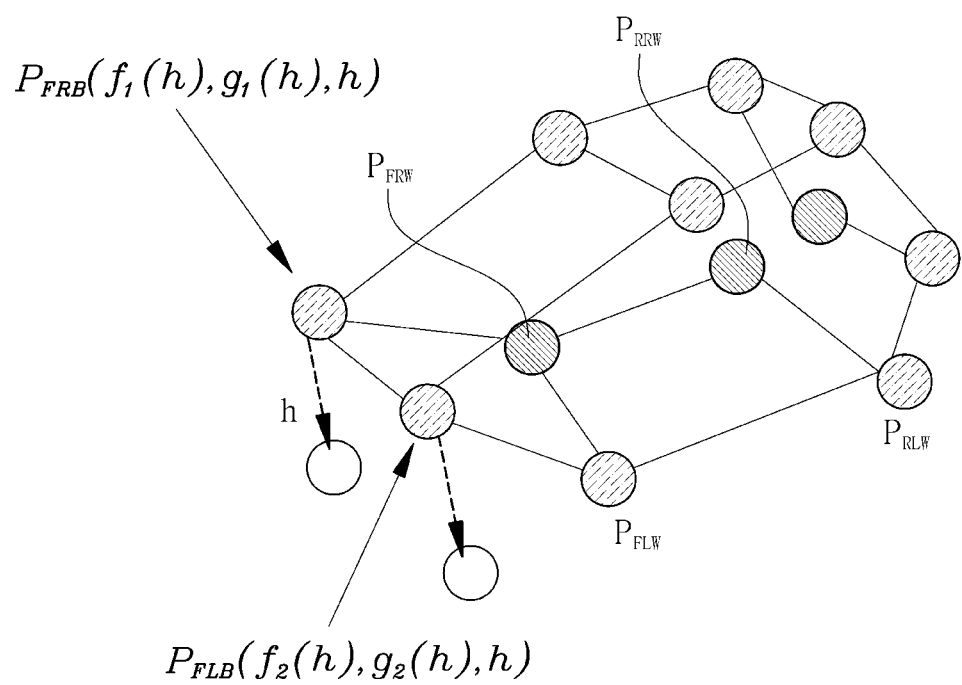
FIGS. 2 and 3 illustrate a process of calculating positions of bumper key points projected onto a plane.
Figure 3:
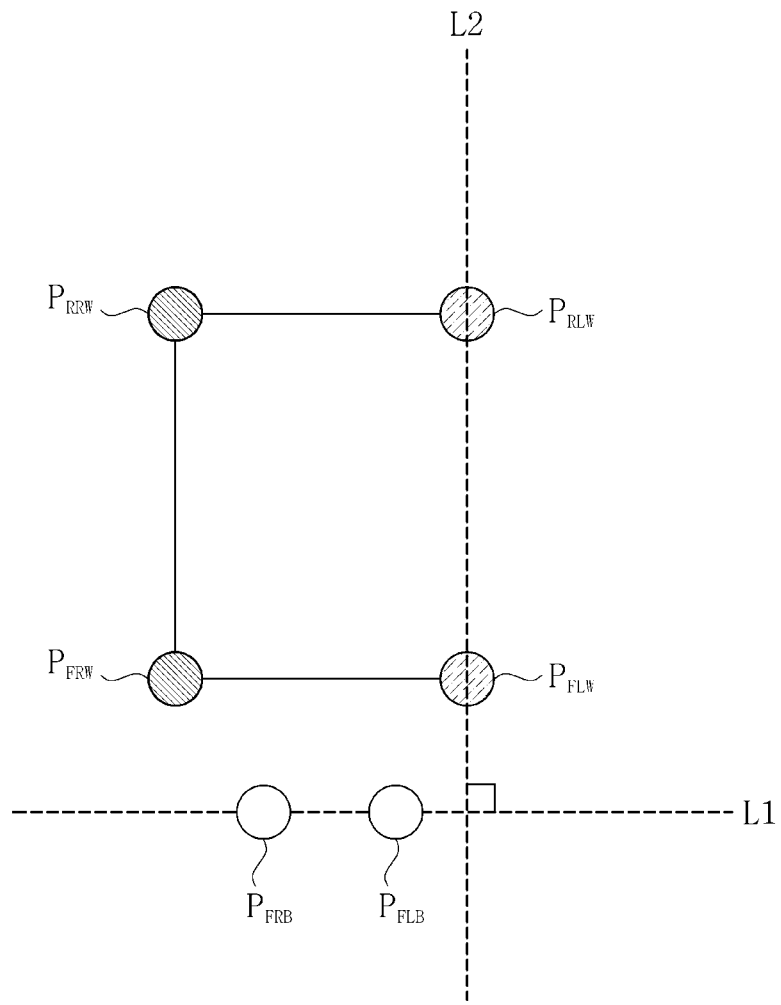

FIGS. 2 and 3 illustrate a process of calculating positions of bumper key points projected on a plane.

Referring to FIG. 2, key point positions $P_{FLB}$, $P_{FRB}$, $P_{FLW}$, and $P_{RLW}$ of the target vehicle on the three-dimensional world coordinate system represent the left bumper, the right bumper, the front left wheel, and the rear left wheel, respectively. F is defined as front, R is defined as rear, L is defined as left, R is defined as right, B is defined as bumper, and W is defined as wheel.

The projection position calculator 126 may represent the three-dimensional world coordinate system of the key points of the left and right bumpers as a functional relationship with respect to height values h by applying the above-described first condition in which the Z values of the key points of the left and right bumpers in the world coordinate system are the same in the functional relationship with respect to the Z coordinate values. That is, the functional relationship with respect to the height values h may be represented as $P_{FRB}$ (f1(h), g1(h), h) and $P_{FLB}$(f2(h), g2(h), h).

The projection position calculator 126 may calculate positions of the bumper key points projected on the plane using Equation 2 below derived by applying the above-described second condition in which the line connecting the bumper key points and the line connecting the front and rear wheels, which are projected onto the plane, form a perpendicular in the functional relationship with respect to the height values h.

$$\overrightarrow{P_{FLB}P_{FRB}} \cdot \overrightarrow{P_{FLW}P_{RLW}} = q(h) = 0 \quad \text{[Equation 2]}$$

When the value h is obtained in Equation 2 above and applied to the function relationship of $P_{FRB}$ and $P_{FLB}$ described above, XY plane positions of the bumper key points are calculated.

In addition, because the X and Y coordinate values in the three-dimensional world coordinate system are represented as the functional relationship with respect to the Z coordinate value, such as X=f(Z) and Y=g(Z), if the h value is applied to Z, all three-dimensional coordinates X, Y, and Z values of the bumper key points may be calculated.

Referring to FIG. 3 for better understanding, world coordinate values h (height values) of the bumper key points are calculated using the first condition in which the Z values of the world coordinate system of the bumper key points are the same and the second condition in which the line L1 connecting the bumper key points plane, form a perpendicular, and then an outermost key point of the target vehicle may be calculated by projecting the world coordinate values h on the plane (ground).

As such, a location of the target vehicle, the closest point from the host vehicle to the target vehicle, a portion occupied on the ground, and the heading angle of the target vehicle may be known through points of the front and rear wheels and the bumper key points of the target vehicle, which are projected on the plane.

Figure 4:
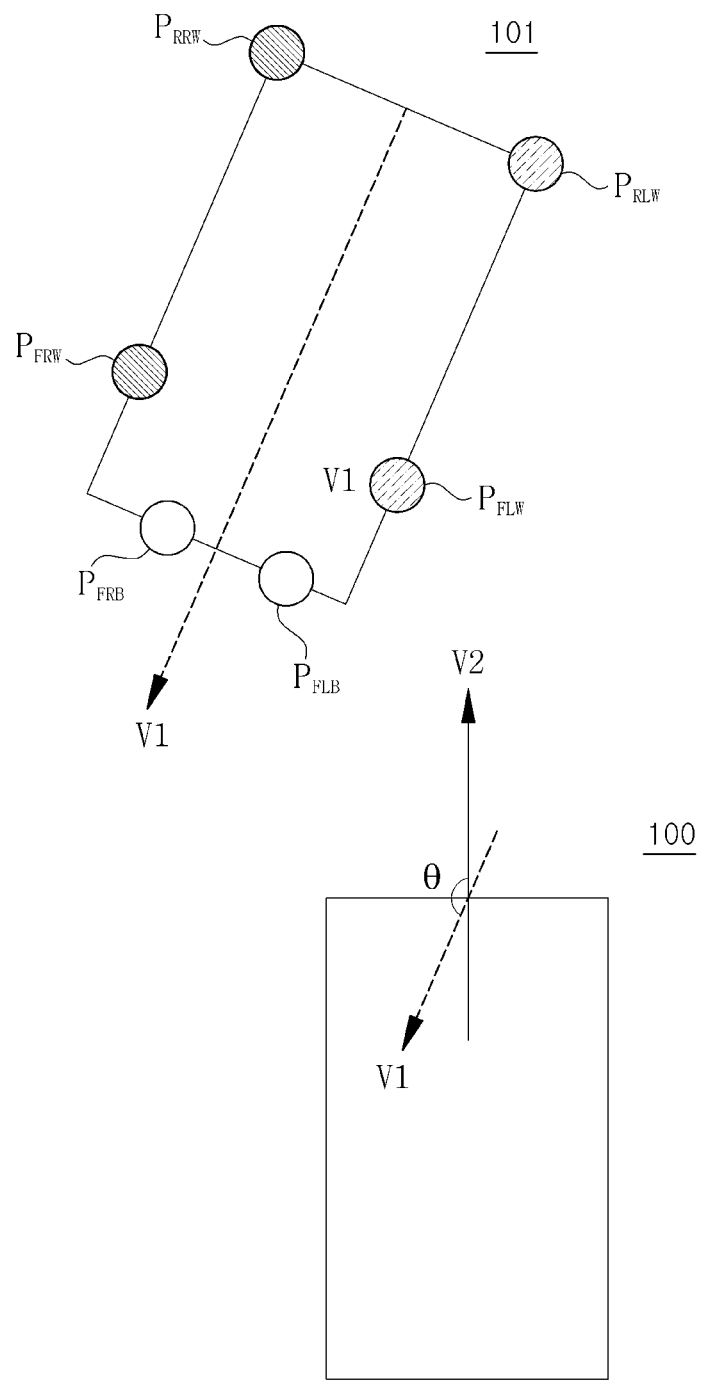
FIG. 4 illustrates a process of calculating a heading angle of a target vehicle from a single video image.

FIG. 4 illustrates a process of calculating a heading angle of a target vehicle from a single video image.

If the bumper key points and the front and rear wheel key points which are projected on the plane are known, the target vehicle 101 may be represented in the form of a quadrilateral box. Herein, a nearest point, which is the closest point from the host vehicle 100, among the outermost parts of the target vehicle 101 may be obtained, and through this, it may be used to control an autonomous vehicle.

As illustrated in FIG. 4, a traveling direction of the target vehicle 101 may be represented through a vector V1 connecting the center of the rear left and right wheel key points $P_{RRW}$ and $P_{RLW}$ and the center of the front left and right wheel key points $P_{FRW}$ and $P_{FLW}$. In this case, a heading angle θ of the target vehicle 101 may be calculated based on the traveling direction vector V1 of the target vehicle 101 and a traveling direction vector V2 of the host vehicle 100.

Through this, it may be determined whether the target vehicle 10 is traveling in the same direction as the host vehicle 100 or in a direction of facing the host vehicle 100.

Figure 5:
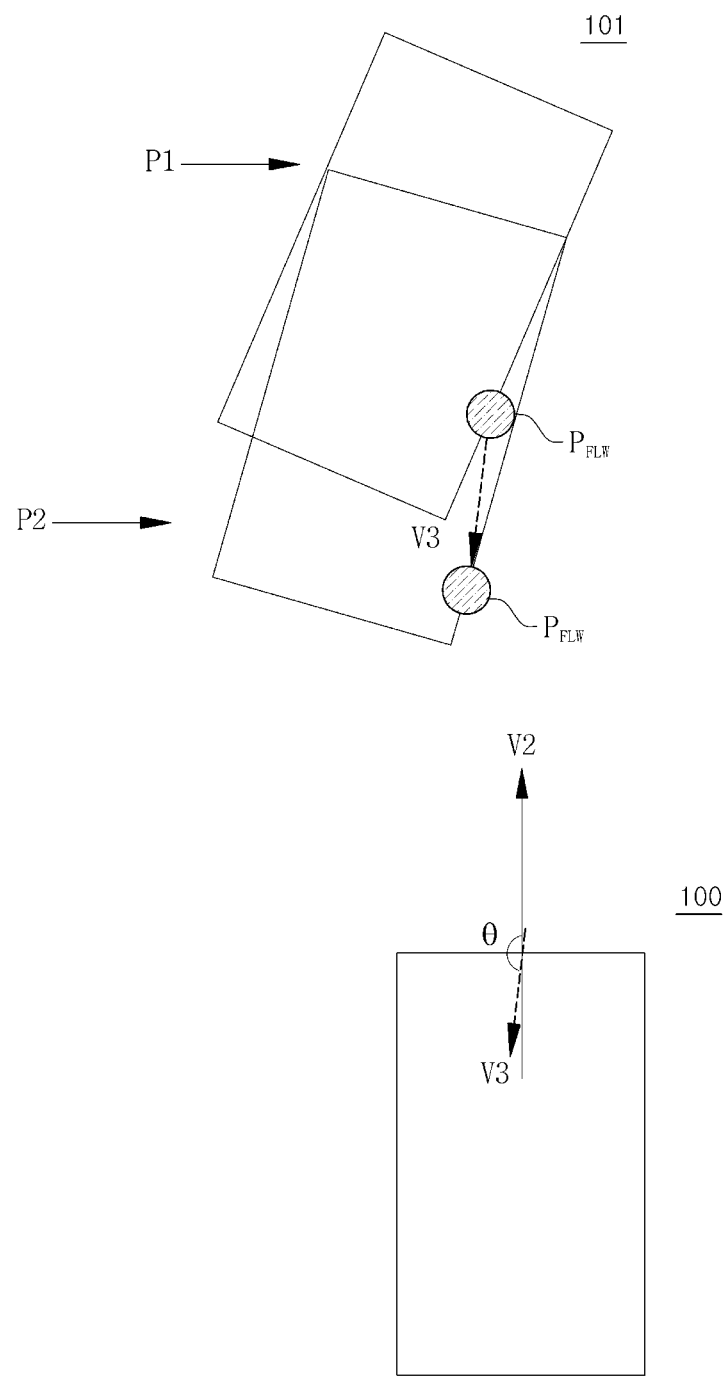
FIG. 5 illustrates a process of calculating the heading angle of the target vehicle from a plurality of video images.

FIG. 5 illustrates a process of calculating the heading angle of the target vehicle from a plurality of video images.

Referring to FIG. 5, the bumper position corrector 130 may correct the positions of the bumper key points on the two-dimensional coordinate system, based on the movement amount of the two-dimensional coordinate values of the key points of the target vehicle 101 recognized at the first position P1 and the second position P2 in the plurality of consecutive video images.

That is, because the shape of the target vehicle 101 does not change in the plurality of consecutive video images, the movement amount of each key point of the target vehicle 101 is the same. Based on this fact, the bumper position corrector 130 may correct the positions of the bumper key points calculated at the first position P1, and a Kalman filter may be used for this purpose.

The heading angle calculator 140 may represent the movement amount of the two-dimensional coordinate values of the target vehicle key points recognized at the first position P1 and the second position P2 on the plurality of consecutive video images as a vector and calculate the heading angle θ of the target vehicle from a relationship between the corresponding movement amount vector and the traveling direction vector of the host vehicle.

That is, as illustrated in FIG. 5, the heading angle calculator 140 may represent, for example, a movement amount of the key point $P_{FLW}$ of the front left wheel of the target vehicle 101 in the plurality of consecutive video images as a vector V3, and may calculate the heading angle θ of the target vehicle 101 from the relationship between the corresponding movement amount vector V3 and the traveling direction vector V1 of the target vehicle 101. FIG. 5 illustrates only the key point $P_{FLW}$ of the left front wheel of the target vehicle 101 for ease of understanding for reference.

If the calculated value of the heading angle θ exceeds, for example, 90 degrees, it indicates that the host vehicle 100 and the target vehicle 101 are moving in opposite directions. On the other hand, if the calculated value of the heading angle θ does not exceed 90 degrees, it indicates that the host vehicle 100 and the target vehicle 101 are moving in the same direction.

Figure 6:
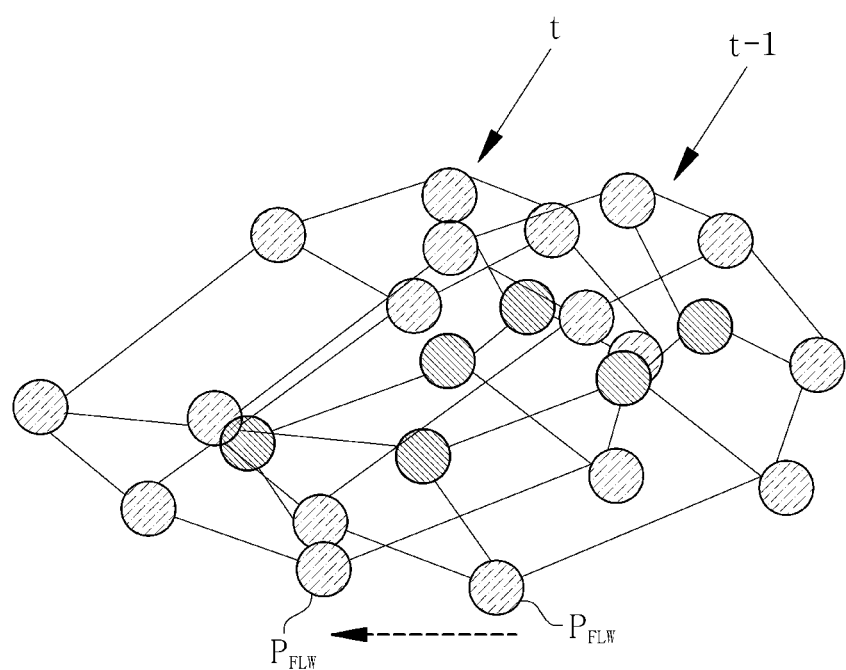
FIGS. 6 and 7 illustrate a process of determining whether the target vehicle is the same object by recognizing a plurality of consecutive video images.
Figure 7:
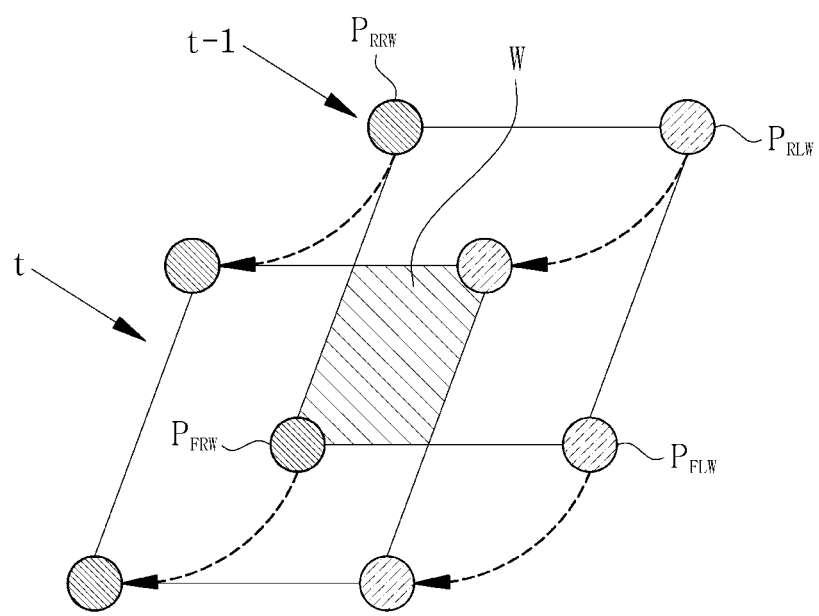

FIGS. 6 and 7 illustrate a process of determining whether the target vehicle is the same object by recognizing a plurality of consecutive video images.

Referring to FIGS. 6 and 7, the object determiner 150 determines whether the target vehicle is the same object based on the movement amount of the key points of the front and rear wheels of the target vehicle recognized in the plurality of consecutive video images.

As illustrated in FIG. 6, the object determiner 150 may, as a result of recognizing the plurality of continuous video images at a time t−1 (first position) and a time t (second position), determine that the smaller the movement amount of the three-dimensional world coordinate values of the key points of the front and rear wheels of the target vehicle, the more the corresponding target vehicle is the same object.

This is because that in the case of the same object in a plurality of consecutive video images, a case in which the movement amount (e.g., distance) from the time t−1 to the time t appears to be the smallest among distances among all key points or the movement amount is less than a threshold value. In the case of other object, the movement amount at the time t−1 and the time t appears as being relatively large.

In addition, as illustrated in FIG. 7, if the three-dimensional world coordinate values of the key points of the front and rear wheels of the target vehicle recognized in the plurality of consecutive video images are projected onto the plane and converted into two-dimensional coordinate values in a video image, and then the converted two-dimensional key points are connected to each other, a quadrilateral box form appears. In this case, the object determiner 150 may determine that the greater an overlapping area W of the quadrilateral boxes (e.g., a first quadrilateral box formed by the key points of the front and rear wheels at time t−1 and a second quadrilateral box formed by the key points of the front and rear wheels at time t), depending on the movement amount of the above-mentioned target vehicle if the above-mentioned quadrilateral boxes appear at the time t−1 and the time t, respectively, the greater the possibility that the target vehicle is the same object. For example, the target vehicle may be considered to be the same object at t−1 and at t if the overlapping area W of the quadrilateral boxes are greater than a threshold value.

This is because that in the case of the same object in a plurality of consecutive video images, a case in which the overlapping area W of the above-described quadrilateral boxes is the largest. If the objects at the time t−1 and the objects at the time t were to be a different object, then overlapping area W of the quadrilateral boxes would be relatively small or nonexistent.

Figure 8:
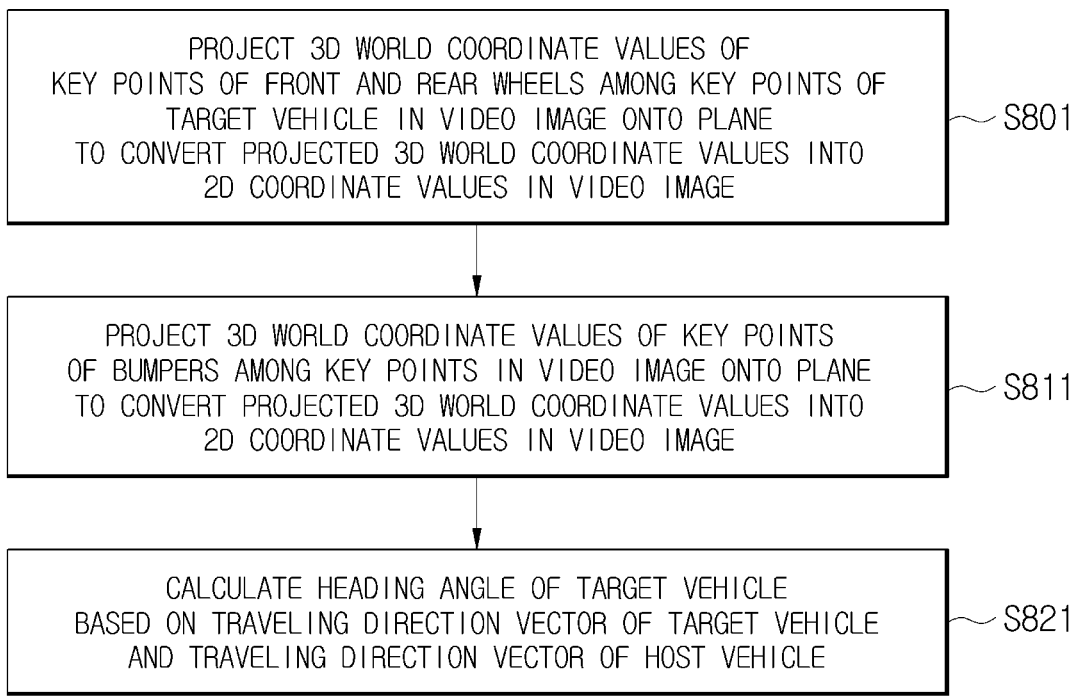
FIG. 8 is a flowchart illustrating a vehicle position calculation method using the components of the vehicle in FIG. 1.

FIG. 8 is a flowchart illustrating a vehicle position calculation method using the components of the vehicle in FIG. 1.

First, the three-dimensional world coordinate values of key points of the front and rear wheels in contact with the ground among the key points of the target vehicle recognized in a video image are projected onto the plane, and the projected three-dimensional world coordinate values are converted into two-dimensional coordinate values in the video image (S801).

Prior to this process (S801), a process of determining whether the target vehicle is the same object may be performed based on the movement amount of the key point of the target vehicle recognized in a plurality of consecutive video images at the time t−1 (first position) and the time t (second position), and as a result of the determination, in the case in which the target vehicle is the same object, this process (S801) and subsequent processes may be performed.

In this case, a process of determining whether the target vehicle is the same object may be performed based on the movement amount of the key points of the front and rear wheels of the target vehicle recognized in the plurality of consecutive video images.

For example, as a result of recognizing the plurality of consecutive video images at the time t−1 and the time t, it may be determined that the smaller the movement amount of the three-dimensional world coordinate values of the key points of the front and rear wheels of the target vehicle, the greater the possibility that the target vehicle is the same object.

In addition, if the three-dimensional world coordinate values of the key points of the front and rear wheels of the target vehicle recognized in the plurality of consecutive video images are projected onto the plane and converted into two-dimensional coordinate values in a video image, and then the converted two-dimensional key points are connected to each other, a quadrilateral box form appears. In this case, if the above-mentioned quadrilateral boxes appear at the time t−1 and the time t, respectively, it may be determined that the greater the overlapping area W of the quadrilateral boxes depending on the movement amount of the target vehicle, the greater the possibility that the target vehicle is the same object.

As a result of the above determination, in a case in which the target vehicle is not the same object, this process (S801) and subsequent processes may be performed on the target vehicle first appearing in the video image.

After the determination for the same object is performed, matching for the same object may be performed in a plurality of consecutive video images, and this process (S801) and subsequent processes may be performed for the target vehicle that is closest to the host vehicle.

Next, the three-dimensional world coordinate values of the bumper key points among the key points in the video image are projected onto the plane, and the projected three-dimensional world coordinate values are converted into two-dimensional coordinate values in the video image (S811).

In this process (S811), a process of calculating positions of the three-dimensional world coordinate value of the bumper key points projected onto the plane may be performed based on the first condition in which the key points of the bumpers have the same Z value in the world coordinate system and the second condition in which the line connecting the key points of the bumpers and the line connecting the front and rear wheels, which are projected onto the plane, form a perpendicular.

Specifically, the process of calculating positions of the three-dimensional world coordinate values of the bumper key points projected onto the plane may be performed by processes of representing the X and Y coordinate values of the key points recognized in the video image in the three-dimensional world coordinate system as a functional relationship with respect to the Z coordinate value, representing the three-dimensional world coordinate system of the bumper key points as a functional relationship with respect to the height values by applying the first condition to the functional relationship with respect to the Z coordinate value, and calculating positions of bumper key points projected on the plane by applying the second condition to the functional relationship with respect to the height values.

Next, the heading angle of the target vehicle is calculated based on the traveling direction vector of the target vehicle and the traveling direction vector of the host vehicle (S821). The vehicle may use the aforementioned information, such as the three-dimensional world coordinate values of key points of front and rear wheels of the target vehicle, the three-dimensional world coordinate values the bumper key points of the target vehicle, the heading angle of the target vehicle, and/or the traveling direction vector of the host vehicle, to control the host vehicle. For example, based on the aforementioned information, the host vehicle may be steered, accelerated, decelerated, engage safety features, and so forth relative to the target vehicle.

For example, the movement amount of the two-dimensional coordinate values of the target vehicle key points recognized at the first position (time t−1) and the second position (time t) in a plurality of consecutive video images is represented as a vector, and the heading angle of the target vehicle may be calculated based on the traveling vector of the target vehicle and the traveling direction vector of the host vehicle.

In addition, in this process (S821), a process of correcting the positions of the bumper key points on the two-dimensional coordinate system may be performed based on the movement amount of the two-dimensional coordinate values of the key points of the target vehicle that has moved from the first position to the second position in a plurality of consecutive video images.

If the target vehicle is recognized in a single video image, the traveling direction of the target vehicle may be represented through the vector connecting the center of the rear left and right wheels and the center of the front left and right wheels of the target vehicle key points. In this case, the heading angle of the target vehicle may be calculated based on the traveling direction vector of the target vehicle and a traveling direction vector of the host vehicle.

As is apparent from the above, a vehicle and a vehicle position calculation method according to the disclosure can calculate a distance and heading angle between a host vehicle and a target vehicle through a video image recognition result obtained by converting key points of front and rear wheels and bumpers of a target vehicle into two-dimensional coordinate values.

The effects of the disclosure are not limited to the effects mentioned above, and other effects not mentioned will be clearly understood by those skilled in the art from the description of the claims.

The one or more example embodiments disclosed with reference to the accompanying drawings have been described above. It will be understood by those skilled in the art that various changes in form and details may be made therein without departing from the spirit and scope of the disclosure as defined by the appended claims. The one or more disclosed example embodiments are illustrative and should not be construed as limiting.

What is claimed is:

1. A host vehicle comprising:
an image sensor;
one or more processors; and
memory storing instructions that, when executed by the one or more processors, cause the host vehicle to:
acquire, using the image sensor, a video image of a target vehicle;
determine, based on the video image, a set of location points of the target vehicle;
project, based on the determined set of location points, first three-dimensional coordinate values of location points corresponding to front and rear wheels of the target vehicle onto a two-dimensional plane by converting the first three-dimensional coordinate values into first two-dimensional coordinate values in the video image;
project, based on the determined set of location key points, second three-dimensional coordinate values of location points corresponding to bumpers of the target vehicle onto the two-dimensional plane by converting the second three-dimensional coordinate values into second two-dimensional coordinate values in the video image; and
control, based on the first three-dimensional coordinate values and the second three-dimensional coordinate values, the host vehicle.

2. The host vehicle according to claim 1, wherein the instructions, when executed by the one or more processors, further cause the host vehicle to project the second three-dimensional coordinate values onto the two-dimensional plane by:
calculating the second three-dimensional coordinate values based on a first condition in which the location points corresponding to the bumpers have a common Z value in a three-dimensional coordinate system and based on a second condition in which a line, projected onto the two-dimensional plane, that connects the location points corresponding to the bumpers is perpendicular to a line, projected onto the two-dimensional plane, that connects the front and rear wheels.

3. The host vehicle according to claim 2, wherein the instructions, when executed by the one or more processors, cause the host vehicle to calculate the second three-dimensional coordinate values of the location points corresponding to the bumpers projected onto the two-dimensional plane by:
representing, in the three-dimensional coordinate system, X and Y coordinate values, of the location points corresponding to the bumpers determined in the video image, as a functional relationship with respect to Z coordinate values;
representing the second three-dimensional coordinate values of the location points corresponding to the bumpers as a functional relationship with respect to height values by applying the first condition to a functional relationship with respect to the Z coordinate values; and
applying the second condition to the functional relationship with respect to the height values.

4. The host vehicle according to claim 1, wherein the instructions, when executed by the one or more processors, further cause the host vehicle to:
correct positions, in a two-dimensional coordinate system, of the location points corresponding to the bumpers based on a movement amount, in a plurality of consecutive video images, of the set of location points of the target vehicle between a first position of the target vehicle and a second position of the target vehicle.

5. The host vehicle according to claim 1, wherein the instructions, when executed by the one or more processors, further cause the host vehicle to:
represent a movement amount, in a plurality of consecutive video images, of two-dimensional coordinate values of the set of location points of the target vehicle, between a first position of the target vehicle and a second position of the target vehicle, as a movement amount vector; and calculate, based on the movement amount vector and a traveling direction vector of the host vehicle, a heading angle of the target vehicle.

6. The host vehicle according to claim 1, wherein the instructions, when executed by the one or more processors, further cause the host vehicle to:

determine whether the target vehicle is common across a plurality of consecutive video images, based on a movement amount of the location points corresponding to the front and rear wheels of the target vehicle determined in the plurality of consecutive video images.

7. A method comprising:

acquiring, via an image sensor of a host vehicle, a video image of a target vehicle;

determining, based on the video image, a set of location points of the target vehicle;

projecting, based on the determined set of location points, first three-dimensional coordinate values of location points corresponding to front and rear wheels of the target vehicle onto a two-dimensional plane by converting the first three-dimensional coordinate values into first two-dimensional coordinate values in the video image;

projecting, based on the determined set of location points, second three-dimensional coordinate values of location points corresponding to bumpers of the target vehicle onto the two-dimensional plane by converting the second three-dimensional coordinate values into second two-dimensional coordinate values in the video image; and control, based on the first three-dimensional coordinate values and the second three-dimensional coordinate values, the host vehicle.

8. The method according to claim 7, wherein the projecting of the second three-dimensional coordinate values onto the two-dimensional plane comprises:

calculating the second three-dimensional coordinate values based on a first condition in which the location points corresponding to the bumpers have a common Z value in a three-dimensional coordinate system and based on a second condition in which a line, projected onto the two-dimensional plane, that connects the location points corresponding to the bumpers is perpendicular to a line, projected onto the two-dimensional plane, that connects the front and rear wheels.

9. The method according to claim 8, wherein the calculating of the second three-dimensional coordinate values comprises:

representing, in the three-dimensional coordinate system, X and Y coordinate values, of the location points corresponding to the bumpers determined in the video image, as a functional relationship with respect to Z coordinate values;

representing the second three-dimensional coordinate values of the location points corresponding to the bumpers as a functional relationship with respect to height values by applying the first condition to the functional relationship with respect to the Z coordinate values; and applying the second condition to the functional relationship with respect to the height values.

10. The method according to claim 7, further comprising:

correcting positions, in a two-dimensional coordinate system, of the location points corresponding to the bumpers based on a movement amount, in a plurality of consecutive video images, of the set of location points of the target vehicle between a first position of the target vehicle and a second position of the target vehicle.

11. The method according to claim 7, further comprising:

representing a movement amount, in a plurality of consecutive video images, of two-dimensional coordinate values of the set of location points of the target vehicle, between a first position of the target vehicle and a second position of the target vehicle, as a movement amount vector; and calculating, based on the movement amount vector and a traveling direction vector of the host vehicle, a heading angle of the target vehicle.

12. The method according to claim 7, further comprising:

determining whether the target vehicle is common across a plurality of consecutive video images, based on a movement amount of the location points corresponding to the front and rear wheels of the target vehicle determined in the plurality of consecutive video images.

13. The method according to claim 12, wherein the determining whether the target vehicle is common across the plurality of consecutive video images comprises:

determining that the target vehicle is common across the plurality of consecutive video images based on the movement amount of the location points corresponding to the front and rear wheels of the target vehicle being at a minimum among distances among the set of location points.

14. The method according to claim 12, wherein determining whether the target vehicle is common across the plurality of consecutive video images comprises:

determining that the target vehicle is common across the plurality of consecutive video images based on an overlapping area between a first quadrilateral, formed by the location points corresponding to the front and rear wheels at a first time, and a second quadrilateral, formed by the location points corresponding to the front and rear wheels at a second time, being greater than a threshold value.

15. The method according to claim 12, further comprising:

determining that the target vehicle is a closest vehicle to the host vehicle.

* * * * *